United States Patent [19]
White

[11] 4,334,050
[45] Jun. 8, 1982

[54] ARENE POLYSULFONYL HALIDE COUPLED BLOCK POLYMERS OF POLYPHENYLENE OXIDE AND AROMATIC POLYFORMALS

[75] Inventor: Dwain M. White, Schenectady, N.Y.

[73] Assignee: General Electric Company, Schenectady, N.Y.

[21] Appl. No.: 232,776

[22] Filed: Feb. 9, 1981

[51] Int. Cl.³ .................. C08G 81/00; C08G 65/38
[52] U.S. Cl. .................... 525/390; 525/535; 525/905
[58] Field of Search ............ 525/390, 535, 905

[56] References Cited

U.S. PATENT DOCUMENTS 3,069,386  12/1962  Barclay ............... 525/434
4,165,422  8/1979   White ................ 525/390

Primary Examiner—Wilbert J. Briggs, Sr.
Attorney, Agent, or Firm—Peter A. Bielinski; James C. Davis, Jr.; Joseph T. Cohen

[57] ABSTRACT

Linear arene polysulfonyl halide coupled block polymers of polyphenylene oxides and aromatic polyformals. These block polymers can be molded, calendered, or extruded as films, sheets, fibers, laminates or other useful articles of manufacture.

5 Claims, No Drawings

ARENE POLYSULFONYL HALIDE COUPLED BLOCK POLYMERS OF POLYPHENYLENE OXIDE AND AROMATIC POLYFORMALS

CROSS-REFERENCE TO RELATED APPLICATIONS

This invention is related to my U.S. patent application Ser. No. 220,662, filed Dec. 29, 1980, which is assigned to the assignee of this application.

BACKGROUND OF THE INVENTION

1. Field of the Invention

This invention relates to linear arene polysulfonyl halide coupled block polymers of polyphenylene oxides and aromatic polyformals. These block polymers can be molded, calendered, or extruded as films, sheets, fibers, laminates or other useful articles of manufacture.

2. Description of the Prior Art

Bis(polyphenylene)-carbonate block copolymers having a limited carbonate segment number average molecular weights, e.g. 250 to 5500, are well known and are described in U.S. Pat. No. 3,875,256. These polyphenylene oxide aromatic carbonate block copolymers are formed by the reaction of carbonyl halides or bis-haloformates, e.g., phosgene or bis-chloroformate, respectively, with polyphenylene oxide in the presence of a hydrogen halide acceptor e.g., an alkali metal hydroxide, an alkaline earth metal hydroxide or oxide or a tertiary amine.

Polyphenylene oxides having an average hydroxyl group per molecule of 1.0 or less, are described in A. S. Hay's U.S. Pat. Nos. 3,306,879; 3,914,266; 4,028,341 and polyphenylene oxides having an average hydroxyl group per molecule greater than zero including 2.0 or less are described in D. M. White's U.S. Pat. Nos. 4,140,675 and 4,234,706 among others.

Polyformals are described in R. Barclay, Jr.'s U.S. Pat. No. 3,069,386 and A. S. Hay's copending U.S. Ser. No. 858,040, filed Nov. 6, 1978, now U.S. Pat. No. 4,134,734.

DESCRIPTION OF THE INVENTION

This invention embodies linear arene polysulfonyl halide coupled block polymers of polyphenylene oxides and aromatic polyformals.

In general, illustrative of the broad group of block polymers included within the scope of this invention are those described among others by the following model structures.

(I linear) AZC, BZC, AZCZA, AZCZB, BZCZB, AZCZBZCZA, AZCZBZCZCZB, etc., etc., etc.

The above illustrative linear combinations of polyphenylene oxide and aromatic polyformals including random and/or alternating arrangements of polymer units defined by the units A, B, C, or coupling agent Z, which units and coupling agents are described in greater detail hereafter are not intended to limit the combinations that can be obtained by the practice of this invention since the block polymer combinations of this invention are limited only by the amount of block polymer precursors charged to the reaction medium in carrying out the process of this invention.

The expression polyphenylene oxides includes "monofunctional polyphenylene oxides" well known to those skilled in the art having an average hydroxyl group per molecule value greater than zero including 1.0 or less. These polyphenylene oxides can be prepared by any of the methods of the prior art, and can be illustrated by the formula (II) set out hereafter:

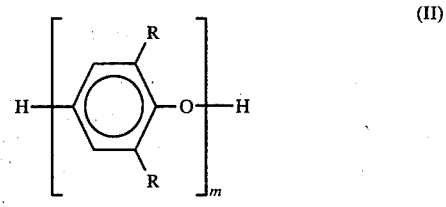

wherein independently each R is hydrogen, a hydrocarbon radical, a halohydrocarbon radical, a hydrocarbonoxy radical or a halohydrocarbonoxy radical, m is a number of at least 1, preferably 10, and more preferably 40 to 170. The monofunctional polyphenylene oxide units of the block polymers can be conceptualized by the structure of formula (II) above wherein the hydrogen atom is disassociated from the monohydroxy group of the polyphenylene oxide, i.e., a phenoxy radical, which may be referred to as a monovalent phenoxy radical, abbreviated herein by the formula —A.

The expression "polyphenylene oxide" also includes "polyfunctional polyphenylene oxides" also well known to those skilled in the art including quinone-coupled polyphenylene oxides having an average hydroxyl group per molecule greater than zero including 2.0 or less. These polyphenylene oxides can be prepared by the methods described in U.S. Pat. No. 4,234,706 and can be illustrated by formula (III) set out hereafter:

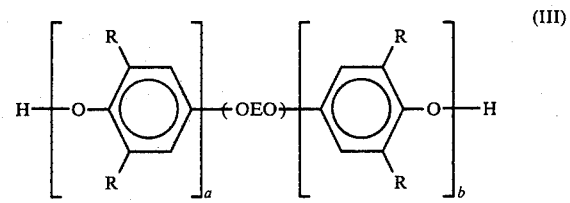

wherein independently $\text{-(OEO)-}$ is a divalent quinone residue, E is a divalent arene radical, either a or b is at least equal to 1, the sum of a plus b is preferably at least equal to 10, more preferably 40 to 170, R is the same as in formula (II) above. The polyfunctional polyphenylene oxide units of the block polymers can be conceptualized by the structure of formula (III) above wherein the hydrogen atoms are disassociated from the hydroxy groups of the quinone-coupled polyphenylene oxide, i.e., a quinone-coupled polyphenoxy radical, which may be referred to as a divalent phenoxy radical, abbreviated herein by the formula —B—.

The expression "aromatic polyformals" as employed herein and in the claims includes any polyformals having an aromatic ring directly bonded to an oxymethylene segment of the aromatic polyformal. These aromatic polyformals can be prepared by the methods described in A. S. Hay's U.S. application Ser. No. 958,040—which methods are incorporated herein in their entirety by reference—and can be illustrated by formula (IV) set out hereinafter;

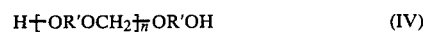

wherein n is an integer at least equal to 1, and R' is a divalent aromatic radical. The aromatic polyformals of the block polymers can be conceptualized by the structure of formula (IV) wherein the hydrogen atoms are disassociated from the hydroxyl groups associated with the aromatic polyformals, which may be referred to herein as a divalent aromatic polyformal radical abbreviated herein by the formula —C—.

Although in formula (IV) above the R' is broadly defined as a divalent aromatic organic radical the term "aromatic" as used herein and in the claims includes any of the well known $C_{(6-25)}$ divalent aromatic radicals, e.g. phenylene, tolylene, xylylene, naphthalene, etc.; halogenated derivatives of such divalent aromatic hydrocarbon radicals, such as chlorophenylene, bromotolylene, etc., divalent radicals, such as —R''QR''—, wherein R'' is selected from $C_{(6-13)}$ divalent aromatic radicals, wherein Q can be cyclohexyl, fluorenyl, —O—, —S—,

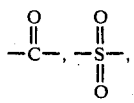

—$C_yH_{2y}$—, y being equal to 1 to 5 inclusive,

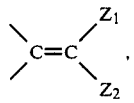

$Z_1$ is selected from hydrogen, chlorine or bromine, $A_2$ is selected from chlorine or bromine.

The expression "coupling agents" as employed herein and in the claims includes "arene polysulfonyl halides," e.g. any arene disulfonyl halide having at least two sulfonyl halide coupling reaction sites. These arene polysulfonyl halides can be illustrated by formula (V) set out hereinafter:

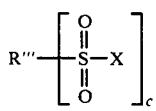 (V)

wherein c is a number at least equal to 2, X is a halogen, e.g., fluorine, chlorine, bromine or iodine, preferably chlorine, and R''' is phenylene, biphenylene, i.e.,

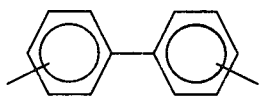

e.g., 2,2'-, 2,3'-, 2,4'-, 3,4'- and 4,4'-biphenylene; bis(-phenylene)-$C_{1-8}$ alkane, i.e.,

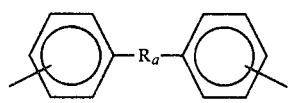

where Ra is $C_{1-8}$ alkylene or alkylidene, e.g., methylene, ethylidene, isopropylidene, butylidene, ethylene, propylene, isopropylene, the various pentylenes, the various hexylenes (including cyclohexylenes) phenylene, biphenylene, etc., biphenylene oxide, i.e.,

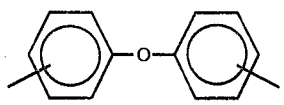

poly($C_{2-8}$ oxyalkylene), having an average of 2 to 10 repeating units, i.e., —(O—$R_b$—O)$_p$ where p is 2-10 and $R_b$ is alkylene, examples of which are given above for $R_a$, and the above mentioned groups containing a phenylene or biphenylene group, e.g., the various phenylenes, biphenylenes, bis(phenylene)-$C_{1-8}$ alkanes, and (bis-phenylene) oxides wherein one up to the total number of aromatic hydrogens have been replaced with halogen, preferably chlorine, and/or $C_{1-8}$ alkyl groups.

Illustrative of a portion of preferably preferred aryl sulfonyl halides are the following:

1,4-benzene disulfonyl dichloride also commonly referred to as
1,4-benzene disulfonyl chloride,
1,3-benzene disulfonyl dichloride,
4,4'-biphenyl disulfonyl dichloride,
3,3'-biphenyl disulfonyl dichloride,
1,5-naphthalene disulfonyl dichloride,
4,4'-diphenylether disulfonyl dichloride,
2,4-toluene disulfonyl dichloride, and
1,3,5-benzene trisulfonyl trichloride.

The most preferred aryl disulfonyl halides are unsubstituted and have two sulfonyl chloride substituents, e.g. benzene disulfonyl dichloride and biphenyl disulfonyl dichloride.

In general, the process of preparing the coupled-block copolymers comprises contacting mono and/or polyfunctional polyphenylene oxides, aromatic polyformal block copolymers and arene polysulfonyl halide coupling agents in the presence of an aqueous solution of a water soluble base and a catalytic phase transfer agent. Any amount of functional (reactive) polyphenylene oxides, aromatic polyformal block copolymers and coupling agent can be employed, e.g. from 1/1000 to 1000 times the stoichiometric requirements required to completely couple all of the reactive polyphenylene oxide and aromatic polyformal block copolymer.

Presently, the process is preferably carried out by introducing a coupling agent to a solution of a polyphenylene oxide and an aromatic polyformal under fluid mixing conditions wherein the liquid reaction medium experiences high fluid shear stress since the process is highly sensitive to the dispersion of the reactants. In a presently more preferred embodiment, the coupling reaction is carried out while introducing the coupling agent to a solution of polyphenylene oxide and aromatic polyformal solution at a point or region within a reaction environment near a mixing impeller, e.g., an axial-flow or radial flow impeller, such as a marine-type mixing propeller, fan turbine, pitched paddle, curved blade turbine, spiral backswept turbine, flat-blade turbine, gas impeller, anchor impeller, etc., in order to establish and maintain high fluid shear rates and accordingly relatedly high fluid shear stresses. The addition of coupling agent under the aforesaid process conditions facilitates the establishment and maintenance of a substantially uniform dispersion of reactants coupling agent, polyphenylene oxide, aromatic polyformal, water soluble base, and catalytic phase transfer agent, and accordingly optimum process efficiency. In general, process equipment employing high-speed axial-flow impeller mixers are presently preferred in the process.

Advantageously and preferably, the process is carried out employing substantially the exact stoichiometric amounts of coupling agent required to completely couple essentially all of the hydroxyl components associated with the polyphenylene oxide and aromatic polyformal reactants. Preferably, the coupling agent is added to the reaction medium continuously during the course of the reation so that the exact stoichiometric coupling agent requirements for completion of the coupling reaction are only satisfied as the last portion of coupling agent is added to the reaction medium.

In a preferred embodiment, the process is carried out in the substantial absence of any solvolyzing agent, e.g., methanol, etc., or any other chemical constituents which can promote undesirable side reactions, e.g., primary or secondary amines. Accordingly, it is highly desirable that individually and preferably collectively any potential solvolyzing agent content be limited to less than 1%, and more preferably less than ½% based on the weight of polyphenylene oxide and aromatic polyformal reactant.

Any water soluble base can be employed, however, preferably in an aqueous solution of a water soluble base, e.g., an aqueous alkaline metal or alkaline earth metal hydroxide or carbonate solution. Specific examples include aqueous solutions of potassium hydroxide, sodium hydroxide, sodium monocarbonate, barium carbonate, etc. Any amount of water soluble base can be employed. Generally effective mole proportions of water soluble base relative to the amount of coupling agent that are employed are coupling agent:water soluble base proportions of from about 1:100 to about 50:1 and more frequently from about 1:10 to about 10:1.

Any catalytic phase transfer agent can be employed, however, preferably is a phase transfer agent selected from the group consisting of quaternary ammoniuum, quaternary phosphonium, and tertiary sulfonium compounds or mixtures thereof. These phase transfer agents are well known and include illustratively "onium compounds" described by C. M. Starks in J.A.C.S. 93, 195 (1971), "crown ethers" described in Aldrichimica ACTA 9, Issue #1 (1976) Crown Ether Chemistry-Principles and Applications, G. W. Gokel and H. D. Durst, as well as C. J. Pederson in U.S. Pat. No. 3,622,577 and "chelated cationic salts" which include alkali or alkaline earth metal diamine halides. Specific illustrative examples are described in U.S. Pat. No. 4,201,721 whose descriptions are incorporated herein in their entity by reference.

Any amount of catalytic phase transfer agent can be employed, however, generally effective molar proportions of phase transfer agent relative to the amount of water soluble base are within the range of from about 1:10 to about 1:1000 and more frequently within the range of from 1:50 to 1:500.

The coupling reactions can be carried out at any temperature. Preferably temperatures within the range of from 0° to 150° C. or even higher, and more preferably from 50° C. to 100° C. are employed.

In order that those skilled in the art may better understand my invention, the following examples are given which illustrate the best mode of practicing my invention.

EXAMPLE 1

(A) Preparation of Polyphenylene Oxide 2,6 xylenol was polymerized in accordance with the following procedure:

A 2.5 gallon stainless steel reactor equipped with an air-driven paddle stirrer, oxygen inlet tube, and water-cooled coil and jacket was charged with 3.4:1 toluene, 150 g 2,6-xylenol, 101 ml. of a stock catalyst solution, i.e., (29.5 ml. bromine added slowly to a chilled solution of 7.76 g. cuprous oxide and 132.0 g. 2,6-xylenol in methanol, then diluted to 1.0 l), 3.67 g. N,N'-di(t-butyl)ethylenediamine (DBEDA), 85.4 g. N,N-dimethylbutlyamine (DMBA), 15 g. di(n-butyl)amine (DBA) and 1.5 g. tricaprylmonomethylammonium chloride (Adogen 464). Oxygen was bubbled into the resulting admixture at a rate of 5 SCFH while vigorously agitating the admixture, 1350 g. of 2,6 xylenol dissolved in 1.4 l toluene was pumped into the reactor over a 30 minute period. The temperature rose from 25° to 35° C. and was held at 35° C. The polymerization reaction was terminated by adding 15 ml. 38% trisodium ethylenediaminetetraacetate ($Na_3EDTA$) in water. The resulting reaction mixture was heated at 55° C. under nitrogen for one hour and then the polymer was precipitated by adding three volumes of methanol. The precipitated polymer was filtered and washed with methanol (5 l) yielding a white solid reaction product having an intrinsic viscosity of 0.24 dl./g. measured in chloroform at 25° C. An infrared spectrum of the polymer showed a peak with an absorbance at 3610 $cm^{-1}$ of 0.40 when measured in carbon disulfide at 2.5 percent concentration in a 1.00 cm. path length cell.

(B) Preparation of Aromatic Polyformal

A solution of 45.6 parts (0.20 mole) of bisphenol-A in 62 ml. of methylene chloride and 93 ml. of N-methylpyrrolidone (NMP) was stirred vigorously under a nitrogen atmosphere with 16.0 parts (0.50 mole) sodium hydroxide pellets at 80° C. for 5 hours. Additional methylene chloride was added and the mixture was filtered while warm. A mixture of 250 ml. methanol and 250 ml. acetone was added to the filtrate to precipitate the polymer. The polymer was collected on a filter and dried at 60° C. and 10 Torr for 20 hours. The weight of dry polymer was 35.8 g.

The polymer was found to have an intrinsic viscosity of 0.21 dl./g. in chloroform at 25° C. The number average molecular weight ($\overline{Mn}$) formed infrared analysis of hydroxyl end groups was 8150. Using either less sodium hydroxide or less methylene chloride with a similar procedure yielded lower molecular weight polyformal. Thus, with 5% less sodium hydroxide, the polymer had an intrinsic viscosity of 0.08 dl./g. in chloroform at 25° C., a Mn of 2560 and a $T_a$ of 52° C. With 70% less methylene chloride. The polymer had an intrinsic viscosity of 0.13 dl./g. and $\overline{Mn}$ of 3770.

EXAMPLE 2

An aryl disulfonyl halide coupled-block polymer of polyphenylene oxide and an aromatic polyformal was prepared utilizing the polyphenylene oxide and the polyformal precursors prepared as described in EXAMPLE 1 above.

A 300 ml. mini-blender was equipped with a nitrogen inlet, a thermocouple near the high shear impeller region of the blender and a port for the introduction of a coupling agent. The blender was charged with 3.0 g. polyphenylene oxide (PPO) resin, 3.0 g. bis-phenol-A polyformal, 18 ml. of chlorobenzene, 0.5 ml. of a 10% (w/v) solution of Aliquat 336(TM) methyltricaprylammonium chloride) in chlorobenzene, and 0.60 g. of 50% aqueous sodium hydroxide. The reaction medium was maintained under an inert nitrogen atmosphere at a temperature of approximately 50° C. while the reaction ingredients were premixed vigorously for 2 minutes. 4,4'-biphenylene disulfonyl chloride (BPSC) was then added. Within 2 minutes a viscous reaction mixture resulted which was diluted with 20 ml. of chlorobenzene, and added to 300 milliliters of methanol with vigorous stirring. A resulting solid precipitate was filtered, washed with methanol, dried at 80° C. for 20 hours under a vacuum of 10 Torr.

Set out in Table I hereinafter is a summary of the reaction parameters including the relative amounts of polyphenylene oxide, polyformal, biphenylene disulfonyl chloride, phase transfer agent, base and solvent employed in this example as well as the amount and the intrinsic viscosity of the resulting product.

TABLE I

| Example | Reaction No. | PPO (g.) | PPO [η] | PF (g.) | PF [η] | PF [M̄n] | Aliquat (g) | 50% NaOH (g) | φCl (ml.) | BPSC (g) | PPO-PF (g) | PPO-PF (η) | $T_g$ |
|---|---|---|---|---|---|---|---|---|---|---|---|---|---|
| 2 | 1 | 3 | 0.24 | 3 | 0.21 | 8100 | 0.03 | 0.60 | 18 | 1.04 | 5.74 | 0.77 | — |

Although the above example if directed to only a few of the many variables which can be employed in the practice of the present invention, it should be understood that the present invention is directed to a much broader class of arene polysulfonyl halide coupled block polymers of polyphenylene oxide and polyformals consisting essentially of chemically arene disulfonyl coupled units of polyphenylene oxides of formulas (II) and/or (III) and aromatic polyformals of formula (IV). The arene polysulfonyl halide coupled block copolymers of polyphenylene oxide and aromatic polyformals can be molded, calendered, or extruded as films, sheets, fiber, laminates, or other useful articles of manufacture.

I claim:

1. An arene polysulfonyl halide coupled block polymer of polyphenylene oxide and an aromatic polyformal.

2. An arene polysulfonyl halide coupled polyphenylene oxide aromatic polyformal block copolymer comprising an arene sulfonyl radical of the formula:

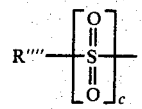

wherein c is a number at least equal to 2, and R''' is selected from phenylene, biphenylene, bis(phenylene)-$C_{1-8}$ alkane, biphenylene oxide, and poly($C_{2-8}$ oxyalkylene); a polyphenylene oxide radical of the formulas:

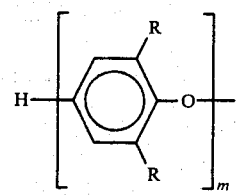

wherein independently each R is hydrogen, a hydrocarbon radical, a halohydrocarbon radical, a hydroxcarbonoxy radical or a halohydrocarbonoxy radical, m is a number of at least 1, or

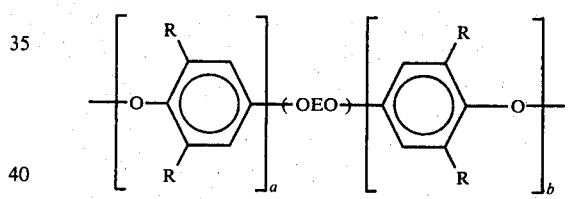

wherein independent each $-\!(\text{OEO})\!-$ is a divalent quinone residue, E is a divalent arene radical, either a or b is at least equal to 1, the sum of a plus b is at least equal to 10, R is the same as above, and an aromatic polyformal radical of the formula:

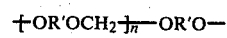

wherein n is an integer at least equal to 1, and R' is a divalent aromatic radical.

3. The claim 2 copolymer where R''' is phenylene or biphenylene.

4. The claim 3 copolymer where c is equal to 2, m is 40 to 170, the sum of a plus b is 40 to 170, and n is 10 to 170.

5. A process of forming an arene polysulfonyl halide coupled polyphenylene oxide aromatic polyformal copolymer comprising contacting a polyphenylene oxide, a polyformal and an arene polysulfonyl halide coupling agent.

* * * * *